United States Patent [19]

Takata et al.

[11] Patent Number: 5,524,659
[45] Date of Patent: Jun. 11, 1996

[54] FLOW CONTROL VALVE AND CONTROL METHOD THEREFOR

[75] Inventors: Koji Takata; Koichi Hashida, both of Itami, Japan

[73] Assignee: Sumitomo Electric Industries, Ltd., Osaka, Japan

[21] Appl. No.: 430,856

[22] Filed: Apr. 28, 1995

Related U.S. Application Data

[62] Division of Ser. No. 196,108, Feb. 23, 1994, Pat. No. 5,460,199.

[30] Foreign Application Priority Data

| | | | |
|---|---|---|---|
| Jul. 13, 1992 | [JP] | Japan | 4-185043 |
| Jun. 7, 1993 | [JP] | Japan | 5-135938 |

[51] Int. Cl.⁶ .................................................. G05D 7/06
[52] U.S. Cl. ......................................... 137/8; 137/486
[58] Field of Search ............................. 137/8, 486, 501, 137/504

[56] References Cited

U.S. PATENT DOCUMENTS

| | | | |
|---|---|---|---|
| 2,272,684 | 2/1942 | Vickers | 137/501 X |
| 3,502,100 | 3/1970 | Jonson | 137/501 X |
| 3,729,018 | 4/1973 | Butterfield | 137/501 X |
| 4,206,781 | 6/1980 | Salter | 137/504 |
| 5,018,797 | 5/1991 | Takata . | |
| 5,127,435 | 7/1992 | Takata | 137/596.17 |
| 5,137,339 | 8/1992 | Brown . | |
| 5,190,068 | 3/1993 | Philbin | 137/486 X |
| 5,215,357 | 6/1993 | Brown . | |
| 5,261,731 | 11/1993 | Togo et al. . | |

FOREIGN PATENT DOCUMENTS

| | | | |
|---|---|---|---|
| 0369412 | 5/1990 | European Pat. Off. . | |
| 0441343 | 8/1991 | European Pat. Off. . | |
| 3412351 | 10/1985 | Germany . | |
| 4121470 | 1/1992 | Germany . | |
| 487668 | 12/1953 | Italy | 137/501 |
| 972771 | 10/1964 | United Kingdom | 137/501 |
| 2106613 | 2/1983 | United Kingdom | 137/505.34 |
| 9203319 | 3/1992 | WIPO . | |

*Primary Examiner*—Robert G. Nilson
*Attorney, Agent, or Firm*—Greenblum & Bernstein

[57] ABSTRACT

The present invention provides a flow control valve which makes it possible to prevent the leakage of hydraulic fluid when the valve is closed while continuously controlling the flow rate. An axially slidable piston (12) housed in a housing (11) provided with a first port (13) and second port (16) is urged by an electromagnet (20). A first closing valve (14) for connecting and isolating the first port (13) and first fluid chamber (A), with a valve seat portion (14C) opened opposite one end portion of the piston (12) in the first fluid chamber (A) and a valve body (14B) which is seated in and separated from the valve seat portion in accordance with the axial displacement of the piston (12), is provided between the first port (13) and the first fluid chamber (A). An orifice (15) is provided in the conduit connecting the first fluid chamber (A) and the second fluid chamber (B).

12 Claims, 5 Drawing Sheets

FLOW CONTROL VALVE AND CONTROL METHOD THEREFOR

This application is a division of application Ser. No. 08/196,108, filed Feb. 23, 1994, now U.S. Pat. No. 5,460, 199 which is the National Phase of PCT/JP93/00948 having an International filing date of Jul. 9, 1993.

FIELD OF APPLICATION IN INDUSTRY

The present invention relates to a flow control valve and control method therefor, and makes possible both the prevention of leakage of hydraulic fluid when the valve is closed and continuous flow control in a flow control valve for a car-borne hydraulic apparatus for steering, suspension or the like, and especially in a flow control valve suitable for use in the brake hydraulic control system of an anti-lock hydraulic control system or such like.

DESCRIPTION OF THE RELATED ARTS

Various conventional flow control valves suitable for the hydraulic apparatus of a brake hydraulic control system have been provided, and the present applicant, for example, proposes a flow control valve of this kind in Japanese Laid-Open Patent Application Nos. 3-90462, 3-223578 and 3-234987.

FIG. 8 shows an example of the flow control valve described in Japanese Laid-Open Patent Application No. 3-90462.

In this flow control valve, a piston 2 is freely slidably disposed in a housing 1, and a first fluid cheer A and a second fluid chamber B are respectively provided between each end portion of the piston 2 and housing 1. A conduit 2B with an orifice 2A is provided axially in the piston 2, and a surface passage 2C connected to the conduit 2B is provided in the circumferential surface of the piston 2. In addition, the piston 2 is urged in an axial direction by a spring 3 and electromagnet 4. Furthermore, an inlet port 1A connected to the conduit 2B by the surface passage 2C and an outlet port 1B connected to the second liquid chamber B are provided in the housing 1.

The flow rate through the orifice 2A is determined by the differential pressure on either side of the orifice connecting the first fluid chamber A and second fluid chamber B, and the differential pressure is determined by the urging force of the spring 3 and electromagnet 4 against the piston 2. A closing valve which connects and isolates the inlet port 1A and surface passage 2C is formed by the sliding of the piston 2 in the housing 1, and the differential pressure on either side of the orifice 2A is maintained by this closing valve. Consequently, the flow rate of hydraulic fluid flowing from the inlet port 1A to the outlet port 1B can be continually adjusted in the flow control valve by adjusting the electric current applied to the electromagnet 4 so as to change the urging force that acts against the piston 2.

In addition, although in this flow control valve the fluid pressure of the outlet port 1B acts in the direction of the axis of the piston 2, the fluid pressure of the inlet port 1A acts via the closing valve formed by the inlet port 1A and the surface passage 2C formed on the circumferential surface of the piston 12, and so does not exert an axial force against the piston 2. The following Formula (1) for differential pressure Pa–Pb on either side of the orifice 2A maintained by the action of the closing valve is thus formed, where Pa is the pressure of the first liquid chamber A, Pb is the pressure of the second liquid chamber B, f is the urging force of the spring, F is the urging force of the electromagnet, and A is the sectional area of the piston:

$$Pa - Pb = (f - F)/A \qquad (1)$$

As Formula (1) indicates, differential pressure Pa–Pb on either side of the orifice 2A bears no relation to the fluid pressure of the inlet port 1A and outlet port 1B in the flow control valve, and is determined solely by the urging forces f and F, and the sectional area A. A flow rate proportional to the square root of the differential pressure passes through the orifice 2A. Namely, the flow control valve has an effect (pressure compensation effect) which makes it possible to control the flow rate regardless of input fluid pressure and output fluid pressure.

When the urging force F of the electromagnet 4 is set higher, the discharge port 1C in FIG. 8 forms a closing valve with the surface passage 2C, and hydraulic fluid with a flow rate corresponding to the urging force F flows from the inlet port 1A to the discharge port 1C.

However, as in the above conventional flow control valve a closing valve is formed by the surface passage 2C in the piston 2 and the inlet port 1A in the housing 1 so as to obtain a pressure compensation effect, there is a leakage channel, shown by X in FIG. 8, which connects the inlet port 1A and outlet port 1B via the sliding surface of the piston 2, even when the closing valve is in a closed state (i.e. when the inlet port 1A and surface passage 2C are not connected). Although the channel is extremely small, it is impossible to prevent the leakage of hydraulic fluid therethrough.

This leakage of hydraulic fluid makes it extremely difficult to apply this flow control valve to uses which require that the slightest leakage when the valve is closed be prevented, such as the discharge valve in an anti-lock brake system.

An addition to the flow control valve with a pressure compensation effect, an on/off-type electromagnetic switching valve which only works fully open and fully closed has been provided. The problem of hydraulic fluid leakage when the valve is closed does not arise with this electromagnetic switching valve, but there are limits to the degree to which smooth and continuous flow control and fine control can be effected, as only full opening and full closing are effected.

SUMMARY OF THE INVENTION

The object of the present invention is to solve the aforementioned problems with conventional flow control valves, and to provide a flow control valve which can continuously control the flow rate without hydraulic fluid leakage occurring when the valve is closed.

In accomplishing these and other objects of the present invention, there is provided a flow control valve comprising: a housing provided with at least a first port and a second port; an axially slidable piston housed in the housing; a first fluid chamber formed between one end portion of the piston and the housing; a second fluid chamber formed between the other end portion of the piston and the housing, and connected to the second port; a conduit connecting the first fluid chamber and second fluid chamber; an orifice provided in the conduit; an urging means for urging the piston in an axial direction; and a first closing valve disposed between the first port and first fluid chamber, with a valve seat portion opened in the first fluid chamber opposite one end portion of the piston and a valve body which is seated in and separated from the valve seat portion in accordance with the axial displacement of the piston, for connecting and isolating the first port and first fluid chamber, wherein the hydraulic force acting on the piston due to the differential pressure generated between the first fluid chamber and second fluid chamber by the flow rate passing through the orifice acts in such a direction that the valve body of the first closing valve is seated in the seating portion.

A poppet valve with a spherical valve body and a seating spring which elastically urges in such a direction that the valve body is seated in the valve seat portion is best used for the first closing valve.

When a third port is disposed in the housing and the first closing valve is in a closed state, a second closing valve which opens and closes in accordance with the axial displacement of the piston may be provided for connecting and isolating the third port and first fluid cheer.

A bypass conduit connecting the first fluid chamber and second fluid chamber may be provided parallel to the conduit, together with a relief valve in the bypass conduit which opens when differential pressure between the first fluid chamber and second cheer exceeds a set value.

It is preferable that at least one of the urging force of the urging means against the piston or the flow-rate sectional area of the orifice be adjustable.

In addition, a differential pressure detecting means for detecting the differential pressure between the first port and second port is provided in the flow control valve according to the present invention. The present invention provides a control method for a flow control valve according to which at least one of the urging force of the urging means against the piston or the flow-rate sectional area of the orifice is controlled in accordance with the controlled variable found as a function of the differential pressure detected by the differential pressure detecting means and the desired flow rate.

By constructing the flow control valve of the present invention as described above, it is possible to prevent the leakage of hydraulic fluid when the first closing valve is closed, as the first closing valve which connects and isolates the first port and first fluid chamber is provided with a valve body which sits in and separates from the valve seat portion in accordance with the axial displacement of the piston. It is also possible to continuously control the rate of flow of hydraulic fluid between the first port and second port by adjusting the urging force of the urging means against the piston and the flow-rate sectional area of the orifice.

In addition, when a third port is provided in a housing with a second closing valve for connecting and isolating the third port and first fluid chamber in accordance with the displacement of the piston, it is possible to not only control the flow rate between the first port and second port, but also to control the flow rate between the third port and the first port or second port. The flow control valve according to the present invention can thus be used as a "dual-effect" flow control valve.

Furthermore, it is possible to increase the flow rate when a bypass conduit and relief valve are provided, as hydraulic fluid flows through the bypass conduit without going through the orifice when the differential pressure between the first fluid chamber and second fluid chamber exceeds a set value.

PREFERRED EMBODIMENTS OF THE PRESENT INVENTION

Figure 1:
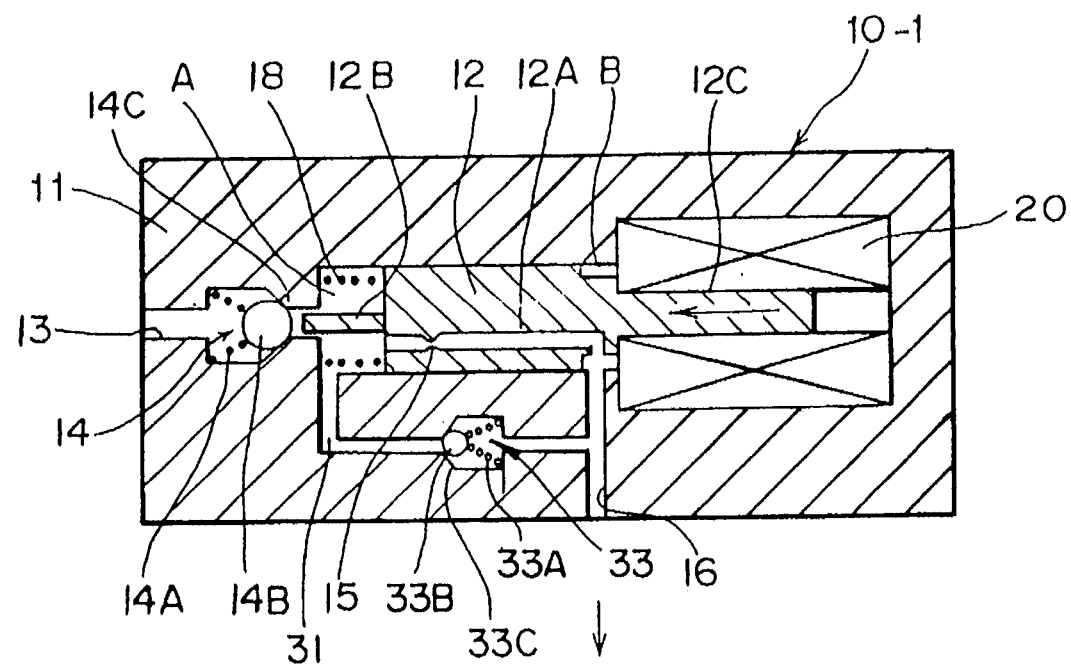
FIG. 1 is a side sectional view showing a flow control valve in a, first embodiment of the present invention.

The following is a detailed description of the present invention based on the embodiments shown in the drawings, although the present invention is not thus limited to these embodiments.

First Embodiment

In the flow control valve 10-1 in a first embodiment of the present invention shown in FIG. 1, an axially slidable piston 12 is housed in an almost liquidtight state within a housing 11 provided with a first port 13, which forms an input opening, and a second port 16, which forms an output opening. In addition, a first fluid chamber A is formed between one end portion of the piston 12 and the housing 11, and a second fluid chamber B connected to the second port 16 is formed between the other end portion of the piston 12 and the housing 11.

A conduit 12A connecting the first fluid chamber A and second fluid chamber B to each other by the orifice 15 is provided through the piston 12. A pushrod portion 12B for opening the closing valve 14 described below is disposed protruding from the end portion of the piston 12 on the side of the first fluid chamber A, and a piston drive element 12C is disposed protruding from the end portion of the piston 12 on the side of the second fluid chamber B.

A spring 18 for maintaining the piston 12 in its initial position by urging the piston 12 axially rightwards in the figure is disposed contracted in the first fluid chamber A, and an electromagnet 20 which constitutes the urging means is disposed on the side of the second fluid chamber B in the housing 11. The piston drive element 12C is inserted into the electromagnet 20 so that when an electric current is applied, the piston 12 is urged axially leftwards in the figure in accordance with the electric current. When the electric current applied to the electromagnet 20 is 0 and no urging force is applied against the piston 12 by the electromagnet 20, the piston 12 is maintained in its initial position by the urging force of the spring 18, as shown in FIG. 1.

As the urging force of the spring 18 diminishes the output of the electromagnet 20, the urging force should be set at the minimum required to maintain the piston 12 in its initial position when the electromagnet 20 is not on.

A first closing valve 14 for connecting and isolating the first port 13 and first fluid chamber A is provided between the first port 13 and first fluid chamber A. The first closing valve 14 is a poppet valve comprising a seating spring 14A, a spherical valve body 14B, and a valve seat portion 14C opened in the first fluid chamber A opposite the end portion of the piston 12.

The valve body 14B is elastically pressed from the left in the figure rightwards into the valve seat portion 14C by the seating spring 14A, so that when in this closed state, the first port 13 and the first fluid chamber A are isolated from each other. In addition, the valve body 14B is pushed leftwards in the figure by the pushrod portion 12B when the piston 12 is displaced leftwards in the figure so as to resist the urging force of the seating spring 14A and open the valve. The first port 13 and the first fluid chamber A are thus connected.

A bypass conduit 31 connecting the first fluid chamber A and the second fluid chamber B to each other is disposed in the housing 11 parallel to the conduit 12A. A relief valve 33 is provided in the bypass conduit 31.

The relief valve 33 comprises a spherical valve body 33B which is elastically urged leftwards in the figure by the seating spring 33A against the valve seat portion 33C. When the fluid pressure of the first fluid chamber A exceeds the fluid pressure of the second fluid chamber B by a set value, the valve body 33B resists the urging force of the seating spring 33A and separates from the valve seat portion 33C, thus opening the valve.

In the flow control valve in the first embodiment, where the effective sectional area of the seat portion of the first closing valve 14 is a, the sectional area of the piston 12 is A, the fluid pressure of the first port 13 is $P_i$, the fluid pressure of the first fluid chamber A is $P_a$, the fluid pressure of the second fluid chamber B and second port 16 is $P_b$, the urging force of the electromagnet 20 is F (disregarding the very weak urging force of the seating spring for maintaining the valve body of the check valve 14), the piston is displaced axially leftwards so that the closing valve 14 opens when the rightward axial force acting on the piston 12 is greater than the leftward axial force. Accordingly, the closing valve 14 opens when Formula (2) is formed:

$$F+P_b \times A - P_a \times (A-a) > P_i \times a \quad (2)$$

A transformation of Formula (2) produces:

$$(P_a - P_b) < (F - (P_i - P_b) \times a)/(A-a) \quad (3)$$

When Formula (3) is formed, the piston 12 is displaced leftwards in the figure, and the first closing valve 14 is opened by the pushing motion of the pushrod 12B. Hydraulic fluid flows from the first port 13 to the first fluid chamber A via the orifice 15 due to the opening of the first closing valve. The fluid pressure $P_a$ of the first fluid chamber A is increased by the flow of hydraulic fluid through the first closing valve 14, and hydraulic force acting rightwards in the figure (in a direction so as to seat the valve body 14B) thus acts on piston 12 by means of the differential pressure between the first fluid chamber A and second fluid chamber B.

When fluid pressure $P_a$ increases, Formula (3) is no longer formed, and the piston 12 is displaced axially rightwards so that the first closing valve 14 closes, and the inlet of hydraulic fluid from the first port 13 is cut off. However, as the first fluid chamber A and second fluid chamber B are mutually connected by the orifice 15, hydraulic fluid which has flowed into the first fluid chamber A is discharged to the second fluid chamber B in proportion to the square root of $(P_a - P_b)$ corresponding with the flow-rate sectional area of the orifice 15, and the fluid pressure $P_a$ of the first fluid chamber A falls. Consequently, Formula (3) is once again formed, and the first closing valve 14 opens so that hydraulic fluid is again allowed to flow in from the first port 13 to the first fluid chamber A.

The inlet quantity of hydraulic fluid to the first fluid chamber A and outlet quantity of hydraulic fluid from the first fluid chamber A are equalized by this opening/closing action of the first closing valve 14, and flow is stabilized when the inequality of Formula (3) becomes an equality. Consequently, if the size of the urging force F of the electromagnet 20 is adjusted and the right of Formula (3) $(F - f - (P_i - P_b) \times a)/(A-a)$ set at a certain value, then this value becomes the pressure differential $(P_a - P_b)$ on the left of Formula (3), and a flow rate proportional to the square root of the differential pressure $(P_a - P_b)$ flows from the first port 13 to the second port 16.

When F=0, i.e. When the electric current is off, the right of the Formula (3) becomes negative, and a state in which $P_a = P_b$ and the flow rate is 0 is maintained without the force to open the first closing valve 14 being generated. Namely, the flow control valve 10-1 in the first embodiment is of a normally closed type wherein the first closing valve 14 is normally in a closed state when the current to the electromagnet 20 is off.

When the valve is closed, there is no leakage of hydraulic fluid from the first port 13 and flow to the second port 16, as a popper valve wherein the valve body 14B is pushed into the seat portion 14C so as to close the valve is used for the first closing valve 14.

Next, differential pressure $(P_a - P_b)$ increases when F is increased from F=0, thus increasing the flow rate of hydraulic fluid flowing from the first port 13 to the second port 16. Accordingly, it is possible to continuously control the through flow-rate of hydraulic fluid in the first embodiment by adjusting the electric current applied to the electromagnet 20.

When differential pressure $(P_a - P_b)$ reaches a set value, in accordance with the increase in the urging force F, the relief valve 33 opens. Hydraulic fluid which has entered from the first port 13 thus flows to the output opening 16 via the bypass conduit 31, and the flow rate of the flow control valve 10-1 temporarily increases.

Of the parameters on the right of Formula (3), values f, A and a are fixed values determined at the design stage. However, $P_b$ and $P_i$ differ depending on the apparatuses connected to the first port 13 and second port 16. Accordingly, the desired flow rate, i.e. the urging force F corresponding to the pressure differential $P_a - P_b$, is a function of the differential pressure between the first port 13 and second port 16.

When, for example, fluid pressure $P_i$ is fixed, the urging force F for obtaining the desired flow rate is determined by measuring fluid pressure $P_b$, and conversely, when fluid pressure $P_b$ is fixed, the urging force F for obtaining the desired flow is determined by measuring fluid pressure $P_i$.

Accordingly, fluid pressures $P_b$ and $P_i$ must be measured and the urging force F set in accordance therewith in order to obtain the desired flow rate in the flow control valve 10-1.

Second Embodiment

Figure 2:
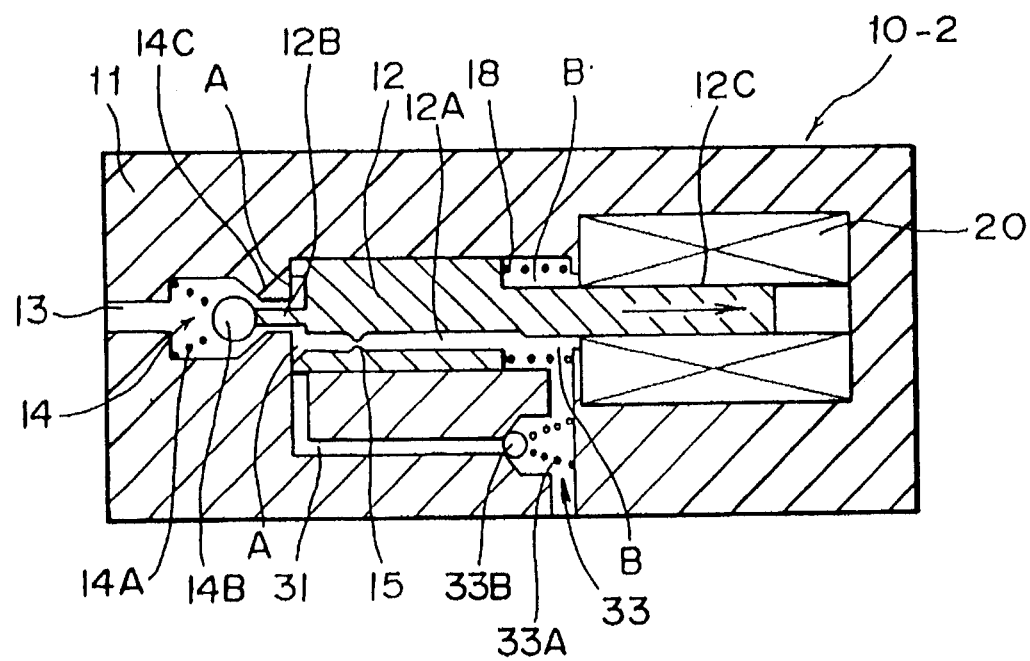
FIG. 2 is a side sectional view showing a flow control valve in a second embodiment of the present invention.

The following is a description of a second embodiment of the present invention shown in FIG. 2.

The electromagnet 20 in the flow control valve 10-2 shown in FIG. 2 is of a retracting type which generates an axial urging force rightwards against the piston 12 when on.

Further, a spring 18 for maintaining the piston 12 in its initial position is provided in the second fluid chamber B in the second embodiment, and the piston 12 is urged leftwards in the direction of the axis by means of the spring 18.

The conditions under which the closing valve 14 opens in the second embodiment are therefore provided by the following Formula (4), which corresponds to Formula (3) in the first embodiment:

$$(Pa-Pb) < (-F+f-(Pi-Pb) \times a)/A-a) \quad (4)$$

When the urging force f of the spring 18 in the flow control valve 10-2 is set so as to exceed Pi×a, and the electromagnet 20 is off so that F=0, Formula (4) is normally formed and the closing valve 14 is in an open state, so that not only does the fluid pressure Pa of the first fluid chamber A increase until Pa=Pi, but the fluid pressure Pb of the second fluid chamber B increases until Pb=Pa=Pi. The flow control valve 10-2 in the second embodiment is thus of a normally closed type wherein the closing valve 14 is normally open when the electromagnet 20 is off.

When the electromagnet 20 is on and an urging force F applied to the piston 12, the inlet rate to the first fluid chamber A and the outlet rate are equalized by the opening and closing of the closing valve 14, as in the first embodiment, and the flow rate is stabilized when the inequality of Formula (4) becomes an equality. In addition, the flow rate through the orifice 15 at this time is proportional to the square root of the differential pressure (Pa–Pb) of the first fluid chamber A and the second fluid chamber B. Consequently, if the urging force F of the electromagnet 20' is increased, differential pressure (Pa–Pb) accordingly falls, and the flow rate of hydraulic fluid flowing from the first port 13 to the second port 16 is reduced. Thus the flow control valve 10-2 in the second embodiment, too, can continuously control the through flow-rate by adjusting the electric current applied to the electromagnet 20.

Furthermore, there is no leakage of hydraulic fluid from the first port 13 to the second port 16 when the urging force F is set larger so that the closing valve 14 is in a closed state, as the first closing valve 14 is constructed so that the spherical valve body 14B is pushed into the valve seat portion 14C.

Further description is omitted as the construction and action of the second embodiment is in all other respects identical to that of the first embodiment.

Figure 3:
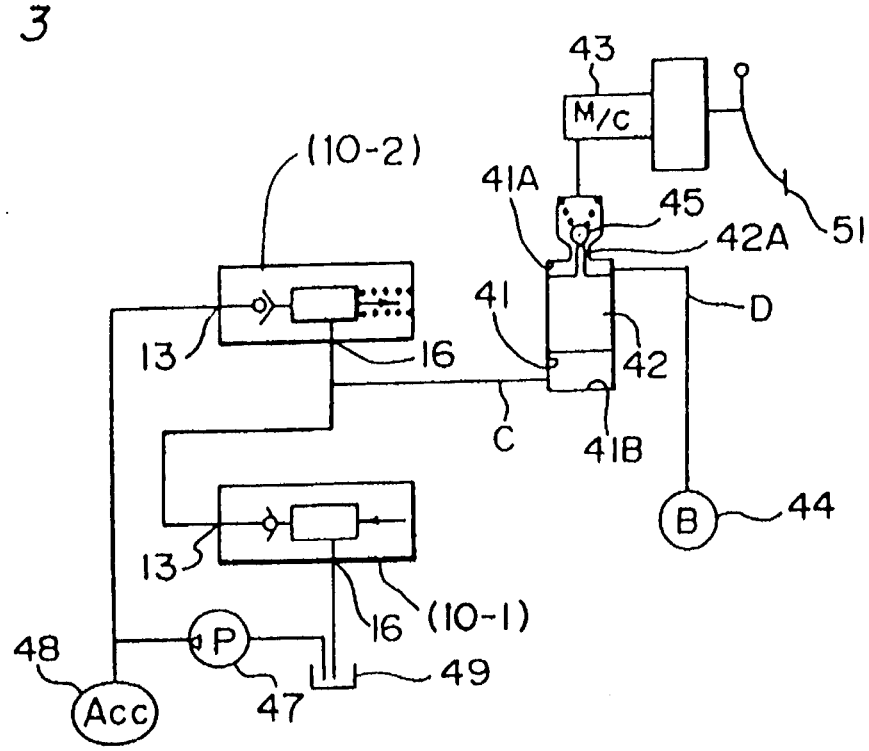
FIG. 3 is a schematic of an anti-lock brake system using the flow control valve according to the present invention.

FIG. 3 shows a highly typified example of a commonly known volume expansion type anti-lock system, wherein the flow control valve 10-2 in the second embodiment is used as a pressure valve, and the flow control valve 10-1 in the first embodiment is used as a discharge valve.

In this anti-lock system, a freely slidable deboost piston 42 is accommodated in a control chamber 41. There is thus a liquidtight partitioning of the control chamber 41 into a first portion 41A and a second portion 41B by the deboost piston 42.

An isolation valve 45 for connecting and isolating the master cylinder 43 and wheel brake 44 is disposed in the first portion 41B. The isolation valve 45 is opened and closed by a pushrod portion 42A disposed on the tip of the deboost piston 42.

An actuator 48 for storing high-pressure hydraulic fluid emitted from the pump 47 is connected to the second portion 41B via the pressure valve consisting of the normally open type flow control valve in the second embodiment. In addition, a reducing valve consisting of the normally closed type flow control valve 10-1 in the first embodiment is connected to the second portion 41B.

The first port 13 in the flow control valve 10-2 forming the pressure valve is connected to the accumulator 48, and the second port 16 therein is connected to the second portion 41B. In addition, the first port 13 in the flow control valve 10-1 forming the reducing valve is connected to the second portion 41B, and the second port 16 therein is connected to the reserver 49. Hydraulic fluid from the reserver 49 is pressurized by the pump 47 and sent to the accumulator 48.

The anti-lock system has, in addition, an electronic control device (not shown in the figure) for detecting signs of wheel lock. An electric current is applied to the electromagnets 20 in the respective flow control valves 10-1, 10-2 in accordance with commands from the electronic control device.

In order to determine the urging forces of the electromagnets 20 corresponding to the desired flow rates in flow control Valves 10-1 and 10-2 described above, it is necessary to know the respective differential pressures of the fluid pressures Pi of the first ports 13 and the fluid pressures Pb of the second fluid chamber B and second port 16. In the case of the flow control valve 10-2 forming the pressure valve in the system shown in FIG. 3, however, fluid pressure Pi is a fixed pressure almost equal to the fluid pressure of the accumulator 48, as the first port 13 is connected to the accumulator 48, in which pressure is almost fixed. In addition, fluid pressure Pb in the flow control valve 10-1 forming the reducing valve is normally almost 0, as the second port 16 therein is connected to the reserver 49, in which pressure is practically zero. Accordingly, only fluid pressure Pb for the flow control valve 10-1 and fluid pressure Pi for the flow control valve 10-2 need be known in order to determine the urging forces F of the electromagnets 20 for the desired flow rates in each of the flow control valves 10-1 and 10-2.

Figure 9:
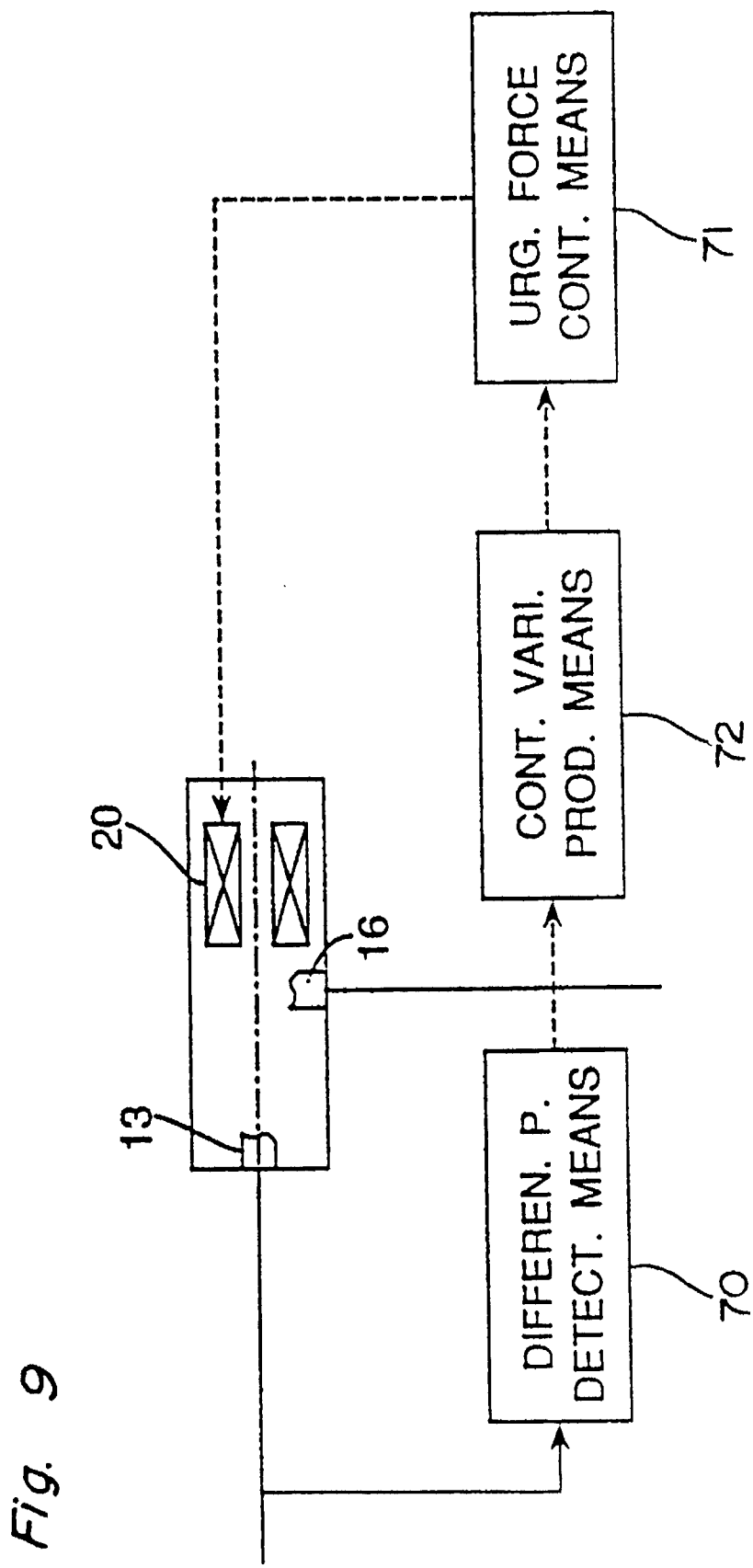
FIG. 9 is a schematic view of control elements used in controlling the flow according to the proposed invention.

Pressure at point C in the system shown in FIG. 3 is therefore measured directly by a pressure sensor 70, shown schematically in FIG. 9 which constitutes the differential pressure detecting means. The electronic control device (i.e., urge force controlling means 71) applies an electric current to the electromagnets 20 so that an urging force corresponding to the desired flow rate for each of the flow control valves 10-1 and 10-2 is generated in accordance with Formulae (3) and (4), as determined by controlled variable producing means 72 where the measured values are the fluid pressure Pb of the flow control valve 10-1 and the fluid pressure Pi of the flow control valve 10-2.

The following is a description of the action of the anti-lock system shown in FIG. 3.

Normally, the flow control valve 10-2 constituting the pressure valve is open and the flow control valve 10-1 constituting the reducing valve is closed, so that the pressure of the accumulator 48 acts on the second portion 41B of the control chamber 41. The deboost piston 42 is therefore in an upward position in the figure and the isolation valve 45 is open, so that hydraulic fluid is supplied from the master cylinder 43 to the wheel brake 44 in accordance with the amount of pressure applied to the brake pedal 50.

Under these normal circumstances, the high-pressure hydraulic fluid of the accumulator 48 and second portion 41b of the control chamber 41 acts on the flow control valve 10-1, which is in a closed state, but as the first closing valve 14 of the flow control valve 10-1 consists of a valve body 14B which is pushed into the valve seat portion 14C so as to close the valve, the fluid pressure of the wheel brake 44 is steadily increased by pressing the brake pedal 50 without any leakage of hydraulic fluid.

When anti-lock control is effected, the flow control valve 10-2 constituting the pressure valve closes and the reducing valve 10-1 opens, so that the hydraulic fluid of the second portion 41B of the control cheer 41 is discharged. When the second portion 41B is decompressed, the deboost piston 42 moves downwards in the figure so that the isolation valve 45 closes. When the deboost piston 42 moves downwards, the volume of the first portion 41A is increased, and thus the fluid pressure of the wheel brake 44 is reduced.

At this point, the desired through flow-rate can be continuously controlled by adjusting the urging force F of the electromagnet 20, as the discharge valve is the flow control valve 10-1 in the first embodiment. Accordingly, it is possible to control the fluid pressure of the wheel brake 44 when anti-lock control is effected in the anti-lock system shown in FIG. 3 more smoothly than with the example where an on/off type electromagnetic switching valve is used for the discharge valve.

It should be noted that in the system shown in FIG. 3, the fluid pressure of the second portion 41B of the control chamber 41 can be found from the fluid pressure of the first portion 41A and the amount of pressure on the brake pedal 51. A pressure sensor may thus be disposed at point D in the figure so as to indirectly measure the fluid pressure at point C corresponding to the fluid pressure Pb of the flow control valve 10-1 and the fluid pressure Pi of the flow control valve 10-2. In addition, fluid pressure at point C may be estimated without the use of a pressure sensor from the occurrence of the signs of the wheels locking or the past performance of the flow control valves 10-1, 10-2 and the brake pedal.

Figure 4:
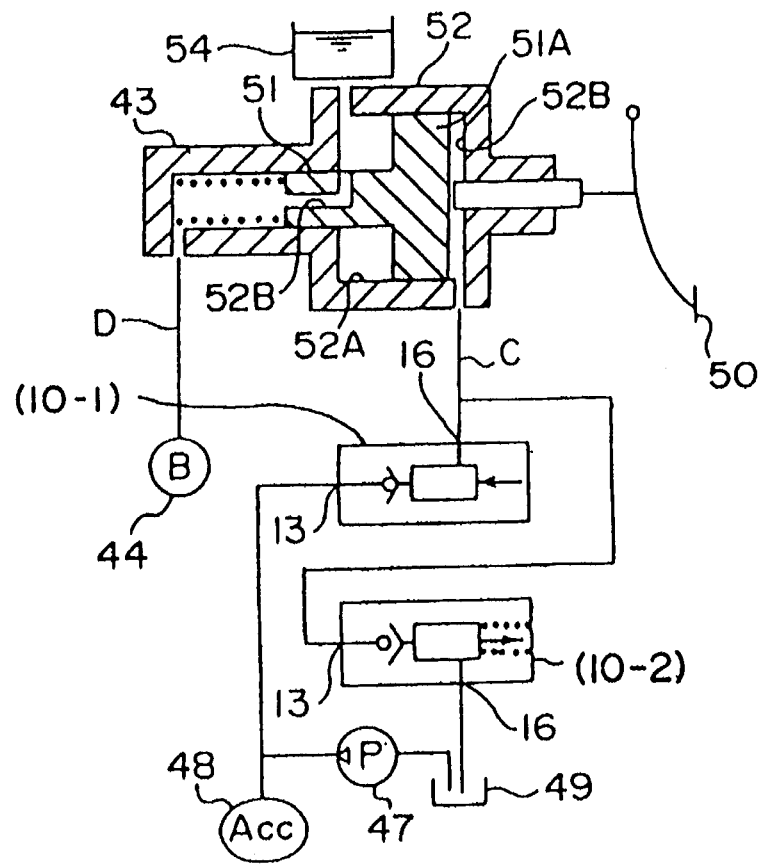
FIG. 4 is a schematic of an electronic control brake booster using the flow control valve according to the present invention.

FIG. 4 shows a highly typified example in which the normally closed flow control valve 10-1 in the first embodiment is used as the pressure valve of a brake booster, and the normally open flow control valve 10-2 in the second embodiment is used as a discharge valve. This kind of brake booster is disclosed in Japanese Laid-Open Patent Application No. 2-73557 filed by the present applicant.

A partition wall portion 51A is provided on the right end portion, as shown in the figure, of the piston 51 slidably fitted in the master cylinder 43. The partition wall portion 51A effects a liquidtight partitioning of the interior of the booster portion 52 disposed continuous with the master cylinder 43 into a first portion 52A and a second portion 52B. In addition, a passage 52B which connects the first portion 52A of the booster portion 52 with the master cylinder 43 when the piston 51 is in the initial position shown in the figure is provided in the piston 51.

A fluid accumulating portion 54 for storing hydraulic fluid is connected to the first portion 52A of the booster portion 52. The second port 16 of the normally closed flow control valve 10-1 forming the pressure valve and the first port 13 of the normally open flow control valve 10-2 forming the discharge valve are each connected to the second portion 52B of the booster portion 52.

The first port 13 of the flow control valve 10-1 is connected to the accumulator 48. In addition, the second port 16 of the flow control valve 10-2 is connected to the reserver 49, and hydraulic fluid in the reserver 49 is conveyed to the accumulator 48 by means of the pump 47.

With the construction shown in FIG. 4, as in the example of an anti-lock system shown in FIG. 3, the hydraulic pressure Pi of the first port 13 of the normally closed flow control valve 10-1 forming the pressure valve is almost fixed, as the first port 13 is connected to the accumulator 48. In addition, the fluid pressure Pb of the second port 16 of the normally closed flow control valve 10-2 forming the reducing valve is almost fixed, as the second port 13 is connected to the reserver 49. Thus with the construction shown in FIG. 4, pressure at point C in the figure is measured by a pressure sensor (not shown in the figure), and the urging force F of the electromagnets 20 is adjusted so as to obtain the desired flow rate for control valves 10-1, 10-2 in accordance with Formulae (3) and (4), where the measured values are the fluid pressure Pb of the flow control valve 10-1 and the fluid pressure Pi of the flow control valve 10-2.

The flow control valve 10-1 which forms the pressure valve in the construction shown in FIG. 4 is normally closed, and the flow control valve 10-2 which forms the reducing valve is normally open, so that the piston 51 moves leftwards in the figure in accordance with pressure on the brake pedal 50 without fluid pressure acting on the second portion 52B of the booster portion 52, and hydraulic fluid is supplied to the wheel brake 44.

Normally, high pressure hydraulic fluid from the accumulator 48 acts on the flow control valve 10-1 which forms the pressure valve, but there is no leakage of hydraulic fluid and no risk of displacement of the piston 51 in spite of the brake pedal 50 not being applied, as the first closing valve 14 of the flow control valve 10-1 is constructed so that the valve body 14B is pushed into the seat portion 14C so as to close the valve.

When boosting, however, the fluid control valve 10-1 which forms the pressure valve opens and the flow control valve 10-2 which constitutes the reducing valve closes. High-pressure hydraulic fluid from the accumulator 48 is thus supplied to the second portion 52B of the booster portion 52, applying pressure, and the piston 51 is displaced to the left regardless of pressure on the brake pedal 50, thus applying pressure to the foil cylinder 43.

Pressurization of the foil cylinder 43 at this time can thus be effected more smoothly than in the example in which the pressure valve is an on/off type electromagnetic valve, as the flow control valve 10-1 which forms the pressure valve can continuously control the through flow-rate by adjusting the urging force F of the electromagnet 20.

When boosting is over, the flow control valve 10-1 which constitutes the pressure valve closes and the flow control valve 10-2 constituting the reducing valve opens, so that the hydraulic fluid of the second portion 52B of the booster 52 is discharged to the reserver 49. At this time, decompression of the second portion 52B can be effected smoothly as the flow control valve 10-2 can continuously control the flow rate by adjusting the urging force F of the electromagnet 20, as when boosting.

Third Embodiment

The following is a description of a third embodiment of the present invention.

Figure 5:
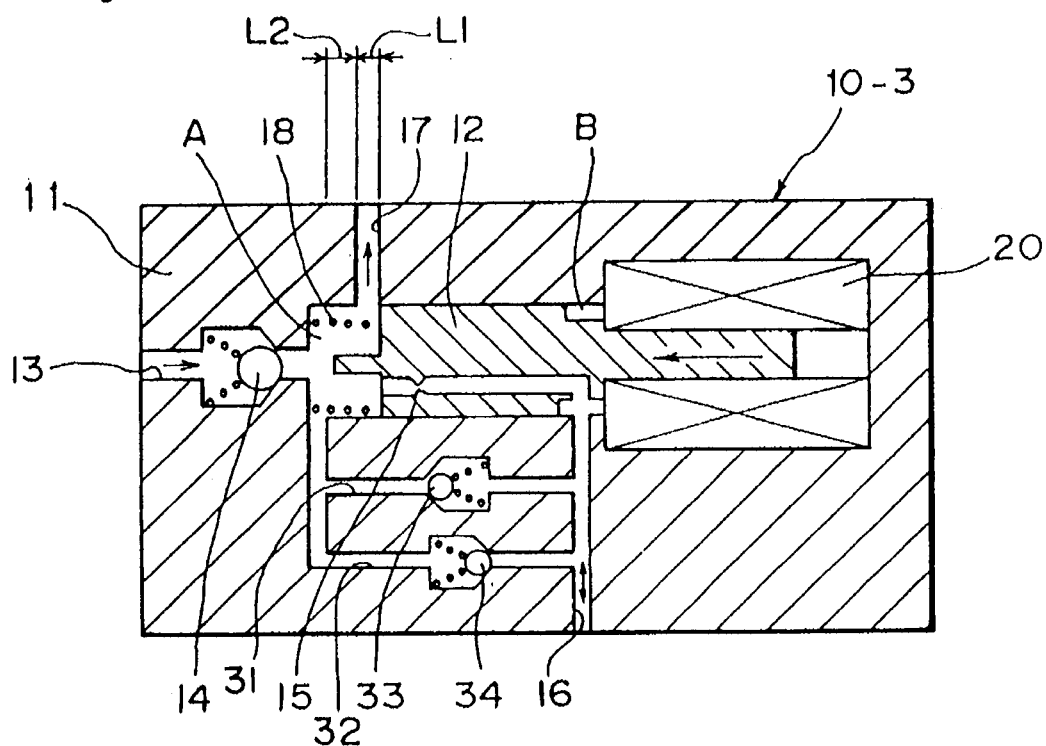
FIG. 5 is a side sectional view showing a dual-effect type hydraulic control system in a third embodiment of the present invention.

The flow control valve 10-3 in the third embodiment shown in FIG. 5 is a dual-effect type flow control valve which combines the flow control valves 10-1, 10-2 in the first and second embodiments. The flow control valve 10-3 is constructed basically the same as the flow control valve 10-1 shown in FIG. 1. A third port 17 connected to the first liquid chamber A and disposed in the housing 11 constitutes the discharge opening, and the piston 12 is used for the second closing valve comprising a spool valve for opening and closing the third port 17.

Namely, the first closing valve 14 is closed when the piston 12 is in the initial position shown in FIG. 5, while the third port 17 is open, thus connecting the third port 17 to the first liquid chamber A. In addition, when the piston 12 moves the first distance L1 leftwards in the figure, the third port 17 is closed, and the connection to the first fluid chamber A cut off, and when the piston 12 moves the second distance L2 leftwards in the figure, the closing valve 14 opens and the first port 13 is connected to the first fluid chamber A.

Further, a second bypass passage 32 is provided parallel to a bypass passage 31 with a relief valve 33 in the third embodiment. The relief valve 34 disposed in the bypass passage 32 opens when the fluid pressure Pb of the second fluid chamber B exceeds the fluid pressure Pa of the first fluid chamber A by a set value.

In the case of the flow control valve 10-3 in the third embodiment, the first closing valve 14 is closed when F<f.

Thus as in the aforementioned Japanese Laid-Open Patent Application No. 3-90462, when:

$$(Pb-Pa) < (f-F)/A \qquad (5)$$

the third port 17 is connected to the first fluid chamber A and fluid pressure Pa falls, and when Formula (5) is no longer formed, the connection between the two is cut off. By such means, a rate of flow almost proportional to the square root of the differential pressure (Pb–Pa) flows through the fixed orifice 15 from the second fluid chamber B towards the first fluid chamber A, and an equilibrium is established in which the inequality of Formula (5) becomes an equality. It is thus possible in the third embodiment to control the flow rate (discharge flow-rate) of hydraulic fluid flowing from the second port 16 to the third port 17 when the first closing valve 14 is closed, regardless of the fluid pressure of the second port 16 and third port 17, and obtain a pressure compensation effect, by constructing so that the third port 17 and the first fluid chamber A are connected and isolated by means of the axial displacement of the piston 12, and changing the urging force F.

When the urging force F is increased, the piston 12 is further displaced leftwards in the figure from the first distance L1 from the initial position in the figure in the interval between F>f and F>f+(Pi–Pb)×a, so that the first closing valve 14 closes and the piston 12 closes the third port 17.

With the flow control valve 10-3 in the third embodiment, there is no leakage of hydraulic fluid from the first port 13 to the second port 16 and third port 17 when the first closing valve 14 is closed, as the first closing valve 14 comprises a spherical valve body 14B pressed into the valve seat portion 14C so as to close the valve, as in the first and second embodiments.

When the urging force F is further increased and F>f+ (Pi–Pb)×a, the third port 17 is maintained in a closed state, while the first closing valve 14 opens and closes in accordance with Formula (3) so that hydraulic fluid with a flow rate corresponding to the urging force F flows from the first port 13 to the second port 16, as in the first embodiment. It is thus possible to continuously control the flow rate by adjusting the urging force F.

The flow control valve 10-3 in the third embodiment may be substituted for the flow control valves 10-1, 10-2 in the brake booster shown in FIG. 4. In this case, the first port 1 of the flow control valve 10-3 is connected to the accumulator, the second port 16 is connected to the second portion 52B of the booster portion 52, and the third port is connected to the reserver 49.

Figure 6:
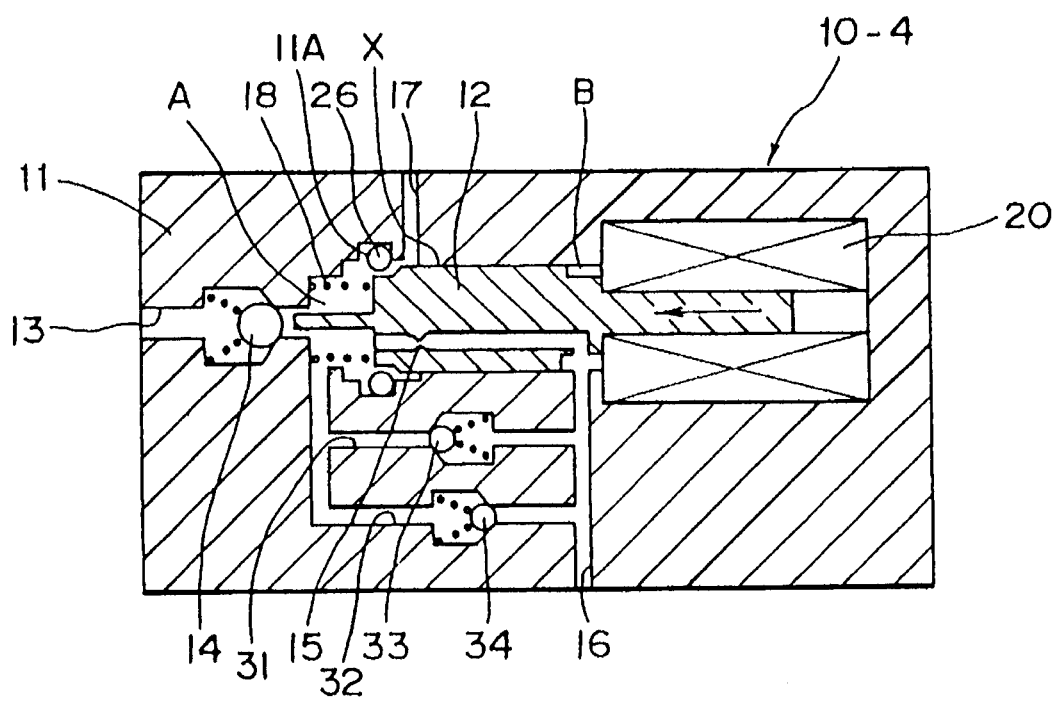
FIG. 6 is a side sectional view showing a modification of the third embodiment.

The flow control valve 10-4 shown in FIG. 6 is a modification of the flow control valve 10-3 in the third embodiment. In flow control valve 10-4, a groove 11A for the insertion of the seal material is provided on the side of the first fluid chamber A of the housing 11, and an elastic ring material 26 for preventing leakage is accommodated in the groove 11A.

With the flow control valve 10-3 shown in FIG. 6, there is the possibility of leakage of hydraulic fluid from the sliding surface X of the piston between the closing of the third port 17 and the opening of the first closing valve 14, as the second closing valve which opens and closes the third port 17 is formed from the third port 17 and the circumferential surface of the piston 12.

However, with the flow control valve 10-4 shown in FIG. 6, the third port 17 is isolated from the first fluid chamber A as the periphery of the piston 12 adheres closely to the ring material 26 when the piston 12 moves axially leftwards from the initial position shown in the figure. The leakage of hydraulic fluid from the third port 17 when both the third port 17 and the first closing valve 14 are closed is thus so restricted that it may be practically ignored with regard to the flow rate through the orifice 15.

The elastic ring material is described in Japan Laid-Open Patent Application Nos. 2-31198 and 2-29828 filed by the present applicant.

Fourth Embodiment

Figure 7:
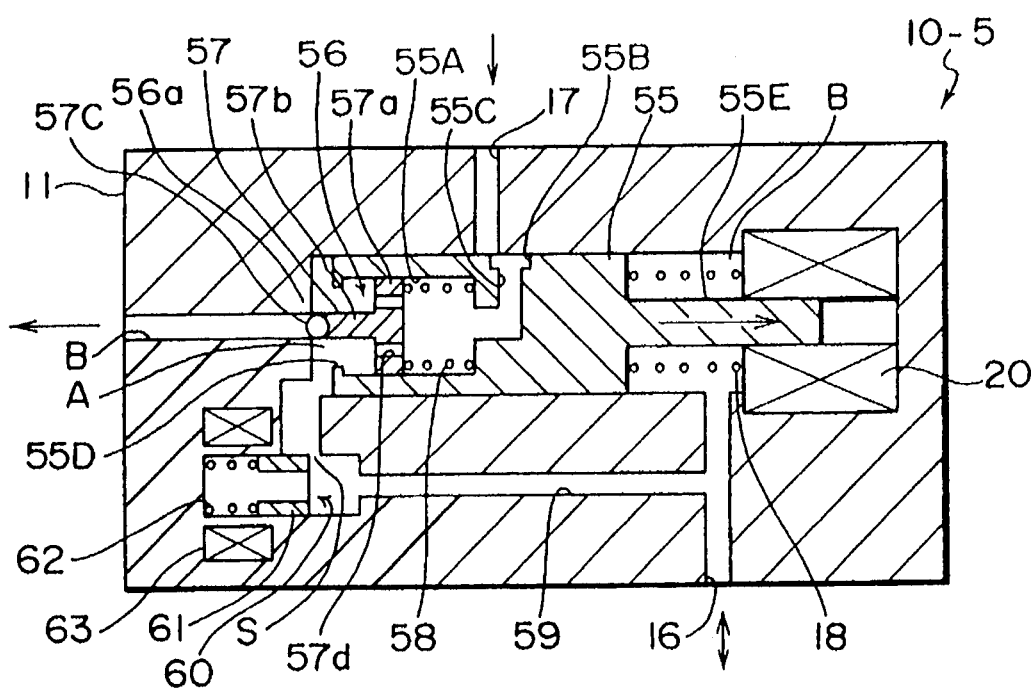
FIG. 7 is a side sectional view showing a flow control valve in a fourth embodiment of the present invention.
Figure 8:
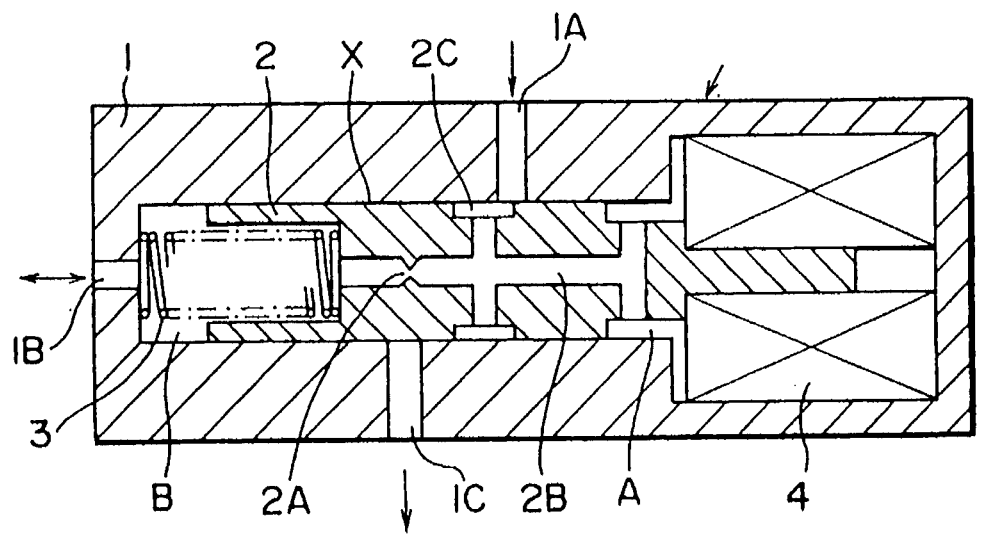
FIG. 8 is a side sectional view showing an example of a conventional flow control valve.

The following is a description of a fourth embodiment of the present invention shown in FIG. 7.

A first port 13 connected to the first fluid chamber A, a second port 16 connected to the second fluid chamber B, and a third port 17 connected to the periphery of the piston 55 are provided in the housing 11 housing a freely sliding piston 55 in the flow control valve 10-5 in the fourth embodiment of the present invention shown in FIG. 7.

A cylindrical fluid chamber 55A is provided hollowed in the end portion of the piston 55 on the left in the figure, and a surface passage 55B is provided on the peripheral surface of the piston 55. The surface passage 55B is connected to the fluid chamber 55A via the passage 55C.

In addition, the valve body 57 of the first closing valve 56 for opening and closing the first port 13 is disposed so as to be freely slidable in the fluid chamber 55A. The valve body 57 comprises a main body 57a which slides axially in the fluid chamber 55A, and a protruding portion 57b protruding from the main body 57a, and is fitted with a spherical body on the tip for closing the first port 13. A spring 58 is provided in a contracted state between the main body 57a and the end portion of the fluid chamber 55A so as to elastically urge the valve body 57 axially leftwards in the figure. A catching portion 55A for resisting the urging force of the spring 58 and catching the valve body 57 is disposed protruding radially from the portion of the piston 55 in which the fluid chamber A is formed. A through hole 57d is provided in the main body 57a of the valve body 57, and the surface passage 55B is normally connected to the first port 13 via the passage 55C, fluid chamber 55A and through hole 57d.

The surface passage 55B is connected to and isolated from the third port 17 by the axial displacement of the piston 55, and the piston 55 functions as the second closing valve for connecting and isolating the third port 13 and first fluid chamber A.

A conduit 59 connecting from the first fluid chamber A to the second fluid chamber B is provided in the housing 11, and a variable orifice 60 is provided in the conduit 59. The variable orifice 60 comprises a moving element disposed so as to be freely slidable in the fluid chamber disposed in the conduit 59, a spring 62 for elastically urging the moving element 61 rightwards in the figure, and an electromagnet 63 for urging leftwards in the figure against the moving element 61. It is possible to change the position of the moving element 61 of the variable orifice 60 by adjusting the electric current to the electromagnet 63, and thus change the sectional area (flow-rate sectional area) of the part indicated by S in the figure.

An electromagnet 20 for inserting a piston drive element 55E as in the first through fourth embodiments is provided in the end portion on the right side in the figure of the piston 55.

The flow control valve 10-5 in the fourth embodiment differs from the first through third embodiments in that the first port 13 is used for the discharge opening, the third port 16 is used for the input opening, and the second port 17 is used for the output opening.

When the electromagnet 20 is not on and F=0, the valve body 57 of the first closing valve 56 is pressured into the valve seat portion 56a by the urging force of the spring 58, and so the first closing valve 56 is in a closed state. The third port 17 is connected to the first fluid chamber A via the surface passage 55B, but when:

$$Pa-Pb>f/A \quad (6)$$

then the piston 12 moves axially rightwards in the figure, and the connection between the two is cut off. At this point, hydraulic fluid with a flow rate corresponding to differential pressure (Pa–Pb) flows from the first fluid chamber A towards the second fluid chamber B so that the pressure of the first fluid chamber A falls, and Formula (6) is again formed. Differential pressure on either side of the variable orifice 60 reaches an equilibrium at a state in which Formula (6) has become an equality due to the opening and closing of the third port 17 by the piston 12. Consequently, the flow control valve 10-5 in the third embodiment functions as a pressure compensation valve in which the third port 17 is on the high-pressure side and the second port 16 is on the high-pressure side when F=0. In addition, the flow rate at this time can be continuously controlled by changing the flow-rate sectional area S of the variable orifice 60.

When the urging force F of the electromagnet 20 is set in proportion to the urging force f of the spring 18, the first closing valve 14 is closed, and the third port 17 is closed by the circumferential surface of the piston 55.

If the urging force F of the electromagnet 20 is made larger than the urging force f of the spring 18, then the piston 12 moves axially rightwards in the figure, and the third port 13 is in a state isolated from the first fluid chamber A. Furthermore, the valve body 57 is caught by the catching portion 55B and moves rightwards in the figure due to the movement to the right of the piston 55, and the first closing valve 14 opens.

$$Pb-Pa<F-f(Pb-Pi)/(A-a) \quad (7)$$

is a condition for the opening of the first closing valve 14, as in the first through third embodiments. When Formula (7) is formed, hydraulic fluid flows from the second port 16 to the first port 13 through the variable orifice 60 so when the fluid pressure Pa of the first fluid chamber A falls, the first closing valve is isolated. When the fluid pressure of the first fluid chamber A rises, Formula (7) is again formed, and the first closing valve 14 opens and closes.

The flow rate of hydraulic fluid flowing from the second port 16 to the first port 13 stabilizes when the inequality of Formula (7) becomes an equality due to the opening and closing action of the first closing valve 14. Thus in the flow control valve in the fourth embodiment, too, it is possible to set the flow rate from the second port 16 to the first port 13 to the desired flow rate by adjusting the urging force F of the electromagnet 20 if the fluid pressures Pb and Pi are known, as with the flow control valves in the first through third embodiments.

In addition, it is possible in the present embodiment to adjust the flow rate of hydraulic fluid by changing the flow-rate sectional area S of the variable orifice 60, while leaving the urging force F of the electromagnet 20 fixed as it is, due to the provision of a variable orifice 60 as described above.

The flow control valve 10-5 in the fourth embodiment may be substituted for flow control valves 10-1, 10-2 in the anti-lock brake system shown in FIG. 3. In this case, the first port 13 of the flow control valve 10-5 is connected to the reservoir 49, the second port 16 is connected to the accumulator 48, and the third port 17 is connected to the second portion 41B of the control chamber 41.

Other Modifications

It should be noted that the present invention is not limited to the above embodiments, and that various modification are possible.

Furthermore, decisions such as whether to use a normally closed valve or a normally open valve, whether to make the first port the input port or the discharge opening, whether or not to provide a third port, whether or not to make the urging force against the piston variable, whether or not to make the flow-rate sectional area of the orifice variable, whether or not to provide a bypass channel and relief valve, and whether to combine any of the above, may be freely made in accordance with the use of the device using the flow control valve, the properties of the hydraulic fluid, the limits of the flow rate to be continuously controlled, and other factors.

Moreover, although the urging force against the piston and flow-rate sectional area of the orifice in the above embodiments are not controlled in steps, control thereof may be effected with multiple step changes, such as two-step and three-step changes.

EFFECT OF THE INVENTION

As is clear from the aforegoing description, the flow control valve according to the present invention comprises a piston urged by an urging means and slidably housed in a housing with at least a first port and a second port, wherein first and second fluid chambers are formed in each end portion of the piston, the second chamber is connected to the second port, and a first closing valve with a valve seat portion opened opposite the end portion of the piston in the first fluid cheer and a valve body which is seated in and separates from the valve seat portion in accordance with the axial displacement of the piston is disposed between the first port and first fluid chamber. In addition, an orifice is provided in the conduit connecting the first fluid chamber and the second fluid cheer. The flow control valve according to the present invention thus makes it possible to simultaneously prevent the leakage of hydraulic fluid when the first closing valve is closed, and continuously control the flow rate of hydraulic fluid by adjusting the urging force of the urging means against the piston, using a simple, low-cost design. The flow control valve according to the present invention is consequently of immense practical value in systems in which it is necessary to measure load fluid pressure (at least one of the output fluid pressure or the input fluid pressure of the hydraulic control system, due to the construction of the system) in order to obtain the desired flow rate, and is of particular value to systems in which the measurement of load fluid pressure is indispensable due to system control requirements.

What is claimed is:

1. A control method for a flow control valve comprising:
providing a flow control valve comprising a housing provided with at least a first port and a second port, a piston housed in the housing so as to be axially slidable, a first fluid chamber formed between one end portion of the piston and the housing, a second fluid chamber connected to the second port formed between the other end portion of the piston and the housing, a conduit connecting the first fluid chamber and the second fluid chamber, an orifice provided in the conduit, urging means for axially urging the piston, and a first closing valve disposed between the first port and the first fluid chamber, with a valve seat portion opened opposite one end portion of the piston in the first fluid chamber and a valve body which is seated in and separated from the valve seat portion in accordance with the axial displacement of the piston, for connecting and isolating the first port and the first fluid chamber, wherein hydraulic force acting on the piston due to differential pressure between the first fluid chamber and the second fluid chamber generated by the flow rate through the orifice acts in a direction so as to seat the valve body of the first closing valve in the valve seat portion;

providing differential pressure detection means for detecting differential pressure between the first fluid chamber and the second fluid chamber; and controlling at least one of either the urging force of the urging means against the piston or the flow-rate sectional area of the orifice in accordance with a controlled variable found as a function of the differential pressure detected by the differential pressure detecting means and the desired flow rate.

2. A control method according to claim 1, further comprising:

providing a third port in the housing; and axially displacing the piston to open and close the third port to the first fluid chamber.

3. A control method according to claim 1, wherein the urging means comprises an electromagnet and said controlling the urging force of the urging means comprises controlling an amount of electric current to the electromagnet to vary the urging force thereof.

4. A control method according to claim 1, further comprising:

providing a force applicator for applying a force in opposition to the urging force to maintain the piston in an initial position; and setting the opposition force of the force applicator to a minimum force required to maintain the piston in the initial position when no urging force is applied by said urging means.

5. A control method according to claim 1, wherein the first closing valve is a poppet valve having an urging member, said method further comprising:

elastically urging the valve body in a direction such that the valve body is seated in the valve seat portion.

6. A control method according to claim 1, further comprising:

providing a bypass conduit parallel to the conduit and connecting the first fluid chamber and the second fluid chamber;

providing a relief valve in the bypass conduit; and relieving the differential pressure between the first fluid chamber and second fluid chamber by opening the relief valve when the differential pressure exceeds a predetermined value.

7. A control method according to claim 6, further comprising:

providing a second bypass conduit parallel to the conduit and connecting the first fluid chamber and the second fluid chamber;

providing a relief valve in the second bypass conduit; and relieving the differential pressure between the second fluid chamber and the first fluid chamber by opening the relief valve when the pressure in the second fluid chamber exceeds the pressure in the first fluid chamber by a second predetermined value.

8. A control method for a flow control valve comprising:

providing a flow control valve comprising a housing provided with at least a first port and a second port, a piston housed in the housing so as to be axially slidable, a first fluid chamber formed between one end portion of the piston and the housing, a second fluid chamber connected to the second port formed between the other end portion of the piston and the housing, a conduit connecting the first fluid chamber and the second fluid chamber, an orifice provided in the conduit, urging means for axially urging the piston, and a first closing valve disposed between the first port and the first fluid chamber, with a valve seat portion opened opposite one end portion of the piston in the first fluid chamber and a valve body which is seated in and separated from the valve seat portion in accordance with the axial displacement of the piston, for connecting and isolating the first port and the first fluid chamber, wherein hydraulic force acting on the piston due to differential pressure between the first fluid chamber and the second fluid chamber generated by the flow rate through the orifice acts in a direction so as to seat the valve body of the first closing valve in the valve seat portion;

providing differential pressure detection means for detecting differential pressure between the first fluid chamber and the second fluid chamber; and controlling the urging force of the urging means against the piston in accordance with a controlled variable found as a function of the differential pressure detected by the differential pressure detecting means and the desired flow rate.

9. A control method according to claim 8, wherein the urging means comprises an electromagnet and said controlling the urging force of the urging means comprises controlling an amount of electric current to the electromagnet to vary the urging force thereof.

10. A control method according to claim 8, further comprising:

providing a bypass conduit parallel to the conduit and connecting the first fluid chamber and the second fluid chamber;

providing a relief valve in the bypass conduit; and relieving the differential pressure between the first fluid chamber and second fluid chamber by opening the relief valve when the differential pressure exceeds a predetermined value.

11. A control method according to claim 10, further comprising:

providing a third port in the housing;

axially displacing the piston to open and close the third port to the first fluid chamber;

providing a second bypass conduit parallel to the conduit and connecting the first fluid chamber and the second fluid chamber;

providing a relief valve in the second bypass conduit; and relieving the differential pressure between the second fluid chamber and the first fluid chamber by opening the relief valve when the pressure in the second fluid chamber exceeds the pressure in the first fluid chamber by a second predetermined value.

12. A control method according to claim 11, further comprising:

providing a groove adjacent the third port in the housing;

providing a seal in the groove; and sealing the piston with the housing upon the axially displacing the piston to close the third port to the first fluid chamber.

* * * * *